United States Patent
Carossi et al.

[11] 3,844,166
[45] Oct. 29, 1974

[54] METHOD AND DEVICE FOR THE MEASUREMENT OF THICKNESS BY ULTRASONIC RESONANCE

[75] Inventors: Jean-Claude Carossi, Manosque; Pierre Fierard, Aix-en-Provence, both of France

[73] Assignee: Commissariat A L'Energie Atomique, Paris, France

[22] Filed: Jan. 23, 1973

[21] Appl. No.: 326,069

[30] Foreign Application Priority Data
Feb. 3, 1972    France .............................. 72.03612

[52] U.S. Cl. .................................................. 73/67.9
[51] Int. Cl. .......................................... G01n 29/04
[58] Field of Search ............ 73/67.8 R, 67.8 S, 67.9

[56] References Cited
UNITED STATES PATENTS
2,800,789   7/1957   Henry .................................. 73/67.8
3,148,536   9/1964   Harris .................................. 73/67.8

Primary Examiner—Richard C. Queisser
Assistant Examiner—John P. Beauchamp
Attorney, Agent, or Firm—Ernest F. Marmorek

[57] ABSTRACT

A part to be subjected to a thickness test is placed near the point of convergence of ultrasonic waves generated by a focusing transducer. The transducer is supplied by an oscillator at a frequency which is modulated in accordance with a sinusoidal law. The frequency of resonance which occurs when the thickness of the part is equal to one-half the transmitted wavelengths is measured by determining the time-duration $\tau$ of a predetermined number $N_o$ of ultrasonic periods from the instant of occurrence of resonance, by determining the time-duration $\tau'$ of $N'$ ultrasonic periods from the instant of occurrence of resonance or from the end of the $N_o$ periods and by combining $\tau$ and $\tau'$ in order to deduce therefrom the resonant frequency and the thickness which are free from the preponderant term of the error resulting from the frequency modulation.

12 Claims, 7 Drawing Figures

METHOD AND DEVICE FOR THE MEASUREMENT OF THICKNESS BY ULTRASONIC RESONANCE

This invention relates to a method for measuring the thickness of parts by ultrasonic resonance; this measurement is carried out by placing the part to be tested for thickness in proximity to the point of convergence of the ultrasonic waves generated by a focusing transducer supplied by an oscillator having a frequency which is adjustable over a suitable range and which is modified in a progressive manner. When the frequency is such that the thickness of the part corresponds to a whole number of half-wavelengths, resonance occurs and is detected in the form of a variation in power at the output of the oscillator. The thickness is accordingly determined by a measurement of frequency.

Some of the instruments which operate on this principle at the present time comprise a cathode-ray tube, the scanning of which is controlled by a generator which also controls the frequency-scanning of the ultrasonic waves emitted by the oscillator. The resonance appears on the screen in the form of a vertical peak, the horizontal position of which depends on the instant at which resonance occurs. The thickness of the part can be deduced from the position of the peak on the screen when the limits of the scanned range of ultrasonic frequencies are known. In the case of a variable setting of the oscillator and of the sweep generator and in the case of parts formed of a given material, it is even possible to graduate the screen of the cathode-ray tube directly in thicknesses.

The instruments which have just been described have the advantage of a short measuring cycle. On the other hand, said instruments are subject to a disadvantage in that they provide information only in analog form and have a non-linear graduation since they make use of frequency scanning in accordance with a time-dependent pseudo-sinusoidal law. The degree of precision afforded by these devices always remains of a low order.

The aim of the invention is to provide a method and a device for measuring thicknesses by ultrasonic resonance by making use of a frequency scan in accordance with a time-dependent sinusoidal law, thereby meeting practical requirements more effectively than comparable methods and devices which were proposed in the prior art, especially insofar as the disadvantages referred to above are largely removed.

To this end, the invention proposes a method for measuring thickness by ultrasonic resonance which is primarily characterized in that a measurement is taken of the time-duration of a predetermined number No of ultrasonic periods from the instant of occurrence of resonance, that a measurement is also taken of the time-duration of N' ultrasonic periods from the instant of occurrence of resonance or from the end of the No periods and that the resonant frequency which is free from the preponderant term of the error resulting from the frequency scan is deduced from the two time-durations and from No and N'. The above-mentioned time-durations are advantageously measured numerically by counting the number of pulses delivered by a clock during the periods No and N'.

The invention also proposes a device for carrying out the method aforesaid, comprising an ultrasonic transducer, means for exciting the transducer at a frequency which is modulated in accordance with a law of substantially sinusoidal time-dependent variation, and means for detecting the resonance and triggering means for counting which determine the time-duration $\tau$ of a predetermined number No of ultrasonic periods from the instant of occurrence of resonance and the time-duration $\tau'$ of N' periods from the instant of occurrence of resonance and for combinating $\tau$ and $\tau'$ in order to deduce therefrom the resonant frequency and the thickness which are free from the preponderant term of the error resulting from the frequency modulation.

A better understanding of the invention will be gained from the following description of a device constituting one mode of application which is given by way of example without any limitation being implied, the intended function of said device being to measure the thickness of tubes at a large number of locations distributed along a helix. Reference will be made to the accompanying drawings, in which:

Figure 1:
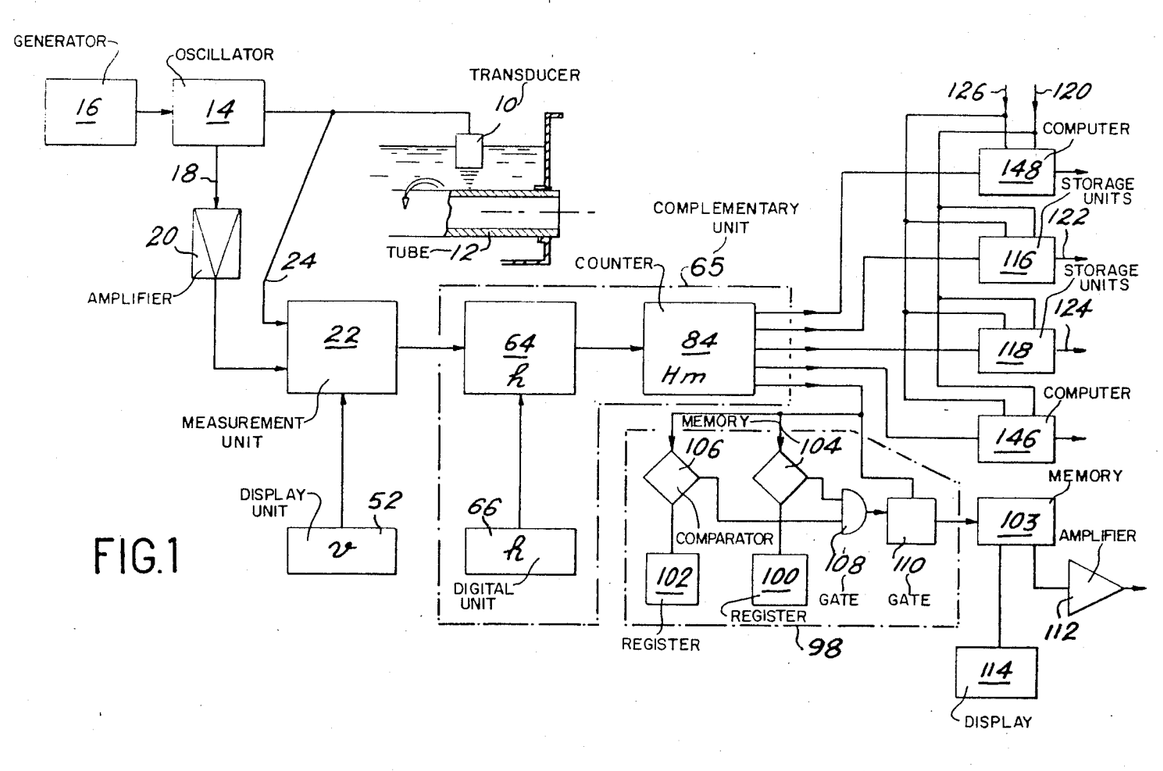
FIG. 1 is a highly simplified block diagram of the complete device.

The device which is illustrated diagrammatically in FIG. 1 comprises an ultrasonic transducer 10 which is stationarily fixed and in which a mechanism (not shown) serves to circulate a tube 12 along a helical path. The transducer is supplied by an oscillator 14, the frequency of which is modulated in accordance with a practically sinusoidal law by a generator 16. When the condition of resonance occurs, the oscillator 14 delivers at an output 18 a pulse which is brought to a sufficient level by an amplifier 20. A thickness measurement unit 22 receives the amplified pulse and also receives via a lead 24 the continuous electrical signal which is at the frequency of the emitted ultrasonic waves and serves to excite the transducer 10.

The section of the device which has been discussed thus far is conventional and therefore does not need to be described in detail. This section can consist of the commercially available unit which has the following characteristics:

range of possible variations at ultrasonic frequency : 1 to 30 Mc/sec, focusing distance from the transducer : 25 mm approximately, frequency scanning : dynamic range of 2, scanning frequency of 300 c/sec, speed of rotation of the tubes : 2000 rpm, distance of travel of tubes: 1 mm per revolution.

When resonance occurs, we have the relation :

(1) $$e = hV/2f_{us}$$

In this formula, $e$ designates the thickness (in millimeters), wherein $V$ is the rate of propagation of ultrasonic waves in the material, (in mm/sec), $f_{us}$ is the frequency of ultrasonic waves (in cycles per second), $h$ is the number of half-wavelengths, that is to say the serial number of the harmonic.

Figure 2:
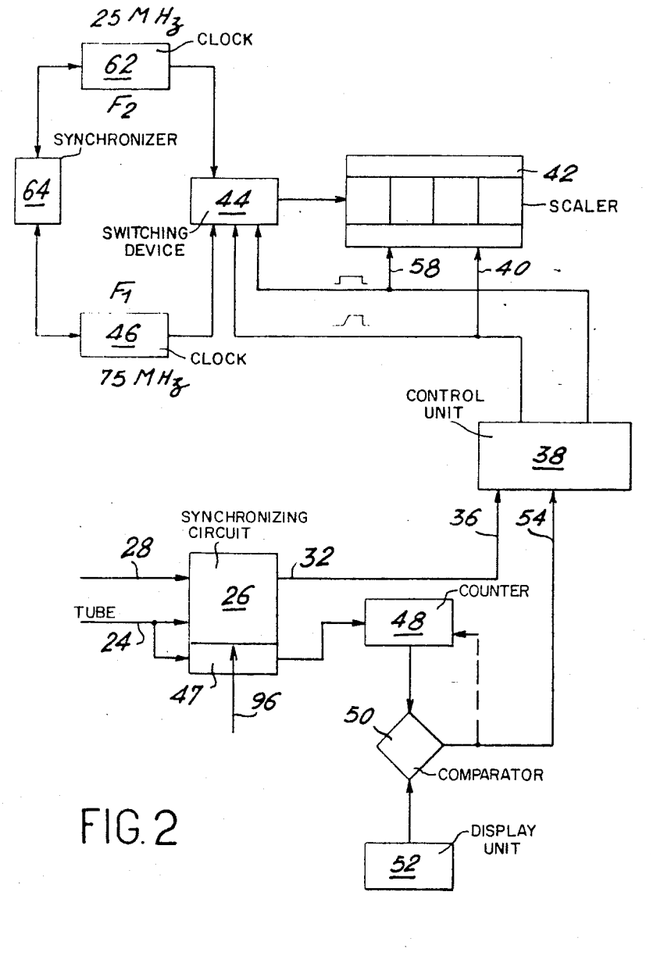
FIG. 2 is a schematic diagram showing the thickness measurement unit of the device of FIG. 1.

The unit 22 which is illustrated in FIG. 2 converts the measurement of frequency at the time example resonance to a measurement of time. The principle of the measurement consists in measuring the duration of a predetermined number of ultrasonic periods. This method would be rigorous if the variation in ultrasonic frequency were extremely slow or if the measurement were carried out over a very small number of periods. However, this is not generally the case. In fact, on the one hand, acceptable resolution is achieved only if there is a sufficient number of pulses delivered by a clock the summated during the number of periods chosen when the measurement is numerical. On the other hand, the obtainment of a measurement rate such that the tube 12 is controlled at very closely spaced locations entails the need for a relatively high scanning frequency (300 c/sec in the example given earlier). In practice, it will be found necessary to choose a number of periods of the order of 70, which corresponds in the case of an ultrasonic frequency of 1 M/sec and a scanning frequency of 300 c/sec to a resolution of approximately $10^{-2}$.

Before describing the measurement unit 22, it will be useful to set forth a few theoretical considerations in order to explain the method of operation employed for reducing the error resulting from the scanning operation by eliminating the preponderant term of said error. For the sake of simplification, these theoretical considerations will be limited to a particular case in which the dynamic range is 2, that is to say in which the frequency $f_{us}$ of the ultrasonic waves varies between a low value $f_0$ and a high value $2f_0$ although it will be understood that the invention is not limited to this particular case.

If the following notations are adopted :
$f$: the frequency of ultrasonic waves at an instant $\tau$ after resonance ;
$f_0$: the minimum frequency of ultrasonic waves ;
$F = \Omega/2\pi$ : the scanning frequency ;
$\phi$ : the phase (the resonance being assumed to take place when $\tau = 0$),
the law of variation of frequency with the time $\tau$ is :
2. $f = f_0/2 \ [3 + \sin (\Omega \tau + \phi) \ ]$ The number $N(\tau)$ of periods which are counted from the time of resonance and the corresponding duration are related by :

$$N(\tau) = \int_0^\tau f \cdot d\tau$$

$N(\tau) = f_0/2 \ [3 \tau + \cos \phi - \cos (\Omega \tau + \Omega)/\Omega]$ (3)
$N(\tau) = f_0/2 \ [3 \tau + \cos \phi/\Omega \cdot \cos^2 \Omega \tau/2 - \sin \phi/\Omega \sin \phi \tau]$ The time interval $\tau_0$ which is free of error and which would be measured over N periods when no scanning takes place (that is to say in respect of $F \approx 0$) is related to N by the formula :

4

$$N = f_0 2 \tau_0 (3 + \sin \phi) = K \tau_0$$

in which K is a constant.

Figure 3:
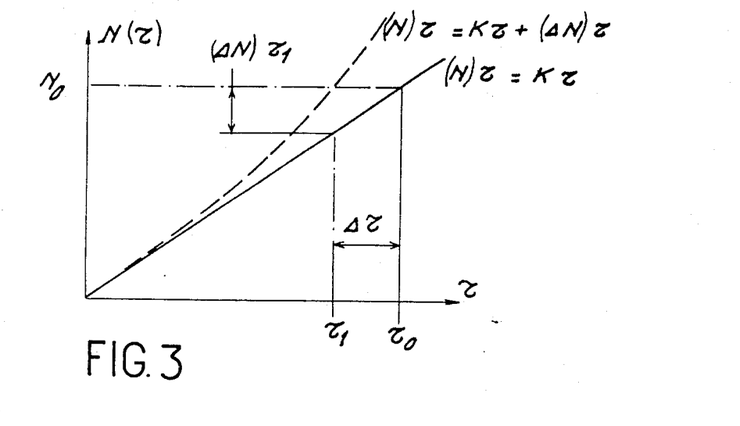
FIG. 3 shows the time-dependent variation of the signals which appear at different locations of the device shown in FIGS. 1 and 2.

The error made in $\tau$ is constituted by the difference $\Delta \tau$ between $\tau_1$ and $\tau_0$, wherein $\tau_1$ is the value of $\tau$ as given by equation (3) and $\tau_0$ is the value given by equation (4). This error appears in FIG. 3 in which the straight, full line corresponds to equation (4) and the dashed curve corresponds to equation (3) in a particular case. In practice, provided that the measurement is carried out over a number of periods N such that the measurement is of short duration compared with the scanning half-period (4 percent, for example), $\Delta \tau$ is small with respect to $\tau_0$. This error can consequently be evaluated to a sufficient extent by means of the approximations which will now be given and which facilitate the approximate determination thereof.

Instead of an error made in the measurement $\tau$ in respect of a predetermined number of ultrasonic periods $N_0$, consideration can be given to the error made in N by counting the number of ultrasonic periods over a predetermined time-duration $\tau$ : a simple calculation in fact shows that the relative errors $\Delta \tau/\tau_0$ and $\Delta N/N_0$ are equal and of opposite sign.

More precisely, the relative error made by counting $N_o$ ultrasonic periods during the time interval $\tau_1$ whereas a linear law would have resulted in a count of No-$\Delta N (\tau_1)$ is equal to $\Delta N (\tau_1)/N_o$ while the relative error made by reason of the fact that the count is stopped when No is attained at the instant $\tau_1 = \tau_0 - \Delta \tau$ or else at the instant $\tau_0$ is equal to $\Delta \tau/\tau_o$ : in point of fact, FIG. 2 shows that:

$\Delta \tau/\tau_o = \tau_1 - \tau_o /\tau_o = - (\Delta N) \tau_o/K \tau_o = - (\Delta N) \tau_1/No$ wherein the full-line curve is a straight line.

In consequence, it is possible to determine the relative error which is made in N ($\tau o$) which is easier to calculate than the error in $\tau$, and to deduce therefrom the error in $\tau$.

In order to make this calculation, it is necessary to return to the formula (3) which becomes, when $\tau = \tau o$ :

$$N (\tau_o) = f_0/2 \ [3 \ \tau_o - \sin \phi \sin \Omega \tau_0/\Omega + 2 \cos \phi/\Omega \cos^2 \Omega \tau_0/2 \ ] \quad (5)$$

since $\Omega \tau_0$ is of small value, $\sin \Omega \tau_0$ can be replaced in formula (5) by $\tau_0 (1 - \Omega^2 \tau_0 2/6)$ and the relative error $\epsilon_N$ in N can be written :

$\epsilon_N = N(\tau_o) - N_0/N_0$, wherein $N_0$ is given by formula (4)

$$\epsilon_N = \frac{\frac{f_0}{2} \left( \pm \frac{\Omega^2 \tau_0^3}{6} + 2 \frac{\cos \varphi}{\Omega} \sin^2 \frac{\Omega \tau_0}{2} \right)}{\frac{f_0}{2} \tau_0 (3 + \sin \varphi)} \quad (6)$$

or else $$\epsilon_N = \frac{2 \frac{\cos \varphi}{\Omega \tau_0} \sin^2 \frac{\Omega \tau_0}{2} - \frac{\Omega \tau_0^2}{2}}{3 + \sin \varphi} \quad (7)$$

Formula (7) serves to evaluate the maximum error and to observe that it can be substantial. In the case of a frequency $f_o$ of 1 Mc/sec, a scan at 300 c/sec and a measurement over a time interval $\tau_o$ of 66 μsec, there is found $\epsilon_N \approx 2 \times 10^{-2}$ under the most unfavorable conditions, that is to say when resonance occurs at 1 Mc/sec (or in other words when $\phi = 0$).

Evaluation of the exact error is difficult since the function (7) is transcendental. In practice, however, the preponderant term of the numerator is always $(\Omega \tau_o)^2/6$ and it is only necessary to eliminate this term in order to achieve satisfactory results.

To this end, the invention proposes to add to the chain for the measurement of $\tau$ in respect of $N_0$ ultrasonic periods a correction chain which will determine the time-durations $\tau$ and $\tau'$ of $N_0$ periods and of $x \cdot N_0$ periods, wherein $x$ is a predetermined number, advantageously equal to 2 in the particular case of a dynamic range of 2 (since $f_{us}$ varies between $f_0$ and $2 f_0$), which will combine the two results $\tau'$ and $\tau$ in order to eliminate the preponderant term of the error, that is to say $(\Omega \tau_o)^2/6$. This mode of correction presupposes that the evaluated error in $N(\tau_o)$ is assimilated with the opposite of the error made in $\tau$ when the measurement of the time interval is stopped at $N = N_o$, which is justified by the indications given in the foregoing.

If the numbers of ultrasonic periods which would be counted during the intervals $\tau 0$ and $2 \tau 0$ from the instant of resonance are designated respectively by $N(\tau_0)$ and $N(2\tau_0)$, the corresponding absolute errors correspond to the numerator of formula (6) and are :

in $N(\tau 0) : (\Delta N) \tau_0 = -f_0/2 \pm \Omega^2/6 \tau_0^3 + 2 \cos \phi/\Omega \sin^2 \Omega \tau_0/2 \approx -f_0/2 \tau_0 \cos \phi/2 \Omega \tau_0 - \Omega^2 \tau_0^2 /6$ in $N(2\tau 0) (\Delta N) 2\tau 0 = -f 0 \tau O(\Omega \tau 0 \cos \phi - 2/3 \Omega^2 \tau O^2)$ It is apparent that the term in $\Omega^2 \tau_0$ can be eliminated between the two equations :

$$N (\tau_o) = No + (\Delta N) \tau 0$$

and $$N (2\tau_o) = 2No + (\Delta N) 2\tau o$$

by forming $4 N (\tau_o) - N (2\tau_o) = 2 N_o + 4 \epsilon' \tau - \epsilon' \tau'$ If one now reverts to the real measurement which is that of the interval $\tau$ of counting of N ultrasonic periods, it is apparent that, by measuring $\tau$ on a number $N_o$, then $\tau'$ on $2N_o$, then by forming $4 \tau - \tau'$, there will be obtained a result which represents $2 \tau_o$ containing an error which is free from the preponderant term caused by a single measurement.

In practice, when the measurement is carried out by summation of the pulses delivered by a clock, the multiplication and division required by the evaluation of $4 \tau - \tau'$ followed by calculation of $\tau_0$ can be performed by adapting a suitable clock frequency. In a preferred embodiment, it will even be possible to obtain a direct indication of $\tau_0$ by employing only a single scaler first by counting-up at a frequency $F_1$ during $N_0$ periods, by counting-down between $N_0$ and $N_1$ at a frequency $F_2 = F_1/4 - 1 = F_1/3$ .

These frequencies $F_1$ and $F_2$ can in any case be chosen so that the number of pulses indicated on completion of the measurement should correspond directly to the thickness of the tube as will be explained hereinafter.

The method which has just been described can be carried out by means of the measurement unit 22, a more detailed diagram of which is given in FIG. 2. For the sake of enhanced simplicity, the description will first be given on the basis of the assumption that only the fundamental resonance is detected when the thickness of the tube is equal to the half-wave, that is to say when $h = 1$ in formula (1).

Figure 4:
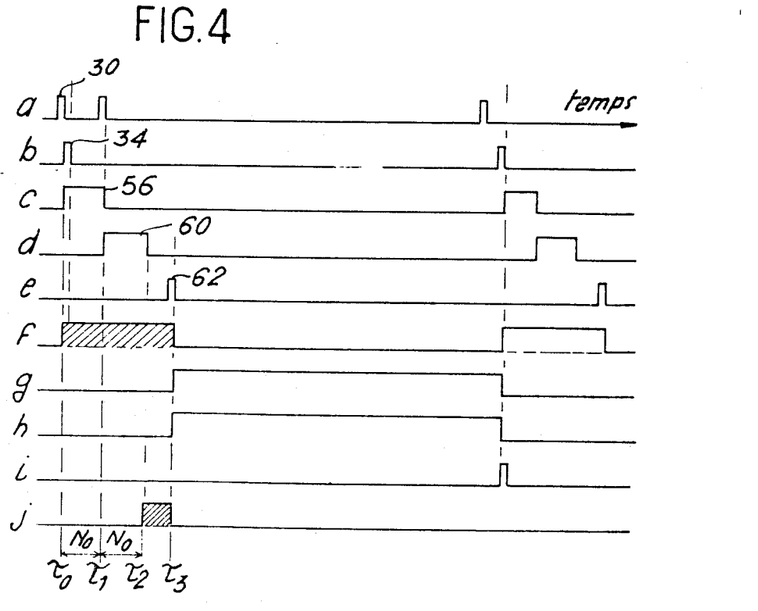
FIG. 4 is an explanatory diagram of the mode of correction adopted in the device of FIG. 2.

Reference will also be made to lines $a$ to $d$ of FIG. 4 which show the sequence of appearance of the pulses at the output of different elements.

The unit 22 is provided at the input end with a synchronization circuit 26. The continuous ultrasonic signal derived from the oscillator 14 is applied to the input 24 of said circuit and the resonance peaks are applied to a second input 28. When a first resonance peak as indicated at 30 in FIG. 4 is applied to the circuit 26, this latter reacts by emitting at its output 32 and at the instant $\tau_o$ a pulse which is synchronized with the beginning of the following ultrasonic half-period as shown at 34 in FIG. 4. This synchronization makes it possible to prevent measurement errors which would have a maximum value equal to the duration of an ultrasonic half-period. The pulse 34 is applied to the input 36 of a control unit 38 which establishes in response a counting order on the input 40 of an up/down scaler 42 and maintains said order until a stopping order is received. The counting order which is applied to the input 40 of the scaler is also applied to a switching device 44 which then supplies the scaler 42 from a clock 46 which emits pulses at the frequency $F_1$ as hereinbefore defined.

The synchronization device 26 also comprises a gate which opens immediately upon transmission of the synchronized pulse 34 at the instant $\tau_o$ (beginning of counting) and transmits to a counter 48 pulses at the frequency of the ultrasonic waves which are applied to the input 24 of the circuit 26. The comparator 50 continuously compares the contents of the counter 48 and the contents of a digital display unit 52 on which has previously been indicated the number $N_0$ of ultrasonic periods whose duration is to be measured by counting. When the comparator 50 establishes at the instant $\tau_1$ the identity of the contents of the counter 48 with the contents of the unit 52, said comparator transmits a pulse to the input 54 of the control unit 38. This pulse causes a change of state of the control unit which interrupts the signal 56 being transmitted to the counting input 40 of the scaler and applies to the count-down input 58 an activation signal 60 (curves $c$ and $d$ of FIG. 4) and causes the change of state of the switching device 44 which then supplies the scaler 42 with pulses (which will be counted-down) at the frequency $F_2$ delivered by a clock 62 which is synchronized by the unit 64 with the clock 46. In practice, there can in any case be employed a single time base comprising dividers which deliver the frequencies $F_1$ and $F_2$ from the same fundamental frequency.

The output signal of the comparator 50 not only initiates a change of state of the control unit 38 as has just been mentioned but also resets the counter 48 (dashed line in FIG. 2). This counter again begins to summate the pulses at the ultrasonic frequency which are delivered by the synchronization circuit 26. When the comparator 50 again establishes the identity at the instant $\tau_2$, it transmits to the control unit 38 a further pulse which stops the operation of the unit 38 (curve $d$ of FIG. 4).

Transition to resonance can result in a number of successive peaks as shown by the curve $a$ of FIG. 4. The synchronization circuit 26 is clearly designed so that only the first peak should be taken into consideration : to this end, said circuit is provided with an inhibition system which prevents the circuit from taking a further pulse into account once a pulse has already been applied thereto until an end-of-measurement signal 62 (the origin of which will be explained hereinafter) is received and also resets the scaler 42 : the corresponding period is indicated by cross-hatchings on the curve $f$ of FIG. 4.

It is clearly an advantage to ensure that the scaler indicates at the time of each end of measurement a numeral which directly represents the thickness of the tube if the velocity of the sound in the material is displayed directly on the unit 52. This result is achieved by adopting particular frequencies $F_1$ and $F_2$ as determined by the simple calculation which will now be given.

If $n$ designates the number which is to be recorded by the scaler 42 and which is to represent the thickness of the tube as expressed in microns and if N designates the velocity of the sound within the material as expressed in hundreds of meters per second, which will be displayed directly on the unit 52 (with $h = 1$), the thickness in microns will be obtained directly on the scaler 42 if the virtual counting frequency $F_c = 2F_2 = 3/2\, F_1$ is $$F_c = f_{us}\, n/N$$

namely in the case of a low frequency of ultrasonic waves of 1 Mc/sec, $F_c = 50$ Mc/sec, $F_1 = 75$ Mc/sec, $F_2 = 25$ Mc/sec.

In order that the device should permit measurements by resonance on a harmonic, it must be provided in addition to the measurement unit illustrated in FIG. 2 with a complementary unit 65. The diagram of a unit of this type which enables the device to work up to the harmonic 9 is given in FIG. 5. The basic principle is as follows : the number $n$ which is supplied by the scaler 42 of FIG. 2 gives only the thickness corresponding to the half-wave resonance. This number must be multiplied by $h$ in order to obtain the real thickness when working on the harmonic h. This involves a simple multiplication which can be performed by a number of different conventional methods. It is necessary, however, to carry out the operation in a very short time in order to work in real time. To this end, the unit 65 is designed to perform the multiplication decade by decade.

For the sake of enhanced clarity, the unit 65 aforesaid will be described at the same time as its operation in a particular case corresponding to that in which the scaler 42 displays the number 1436 and in which the harmonic $h = 3$ has been displayed on a digital unit 66 (Contraves device having a single decade, for example) prior to any measurement at the instant $t_2$, that is to say at the end of the counting operation described in the foregoing the scaler 42 (which will be assumed hereinafter to consist of four decades) displays the number 1436 to be multiplied by $h = 3$.

Figure 5:
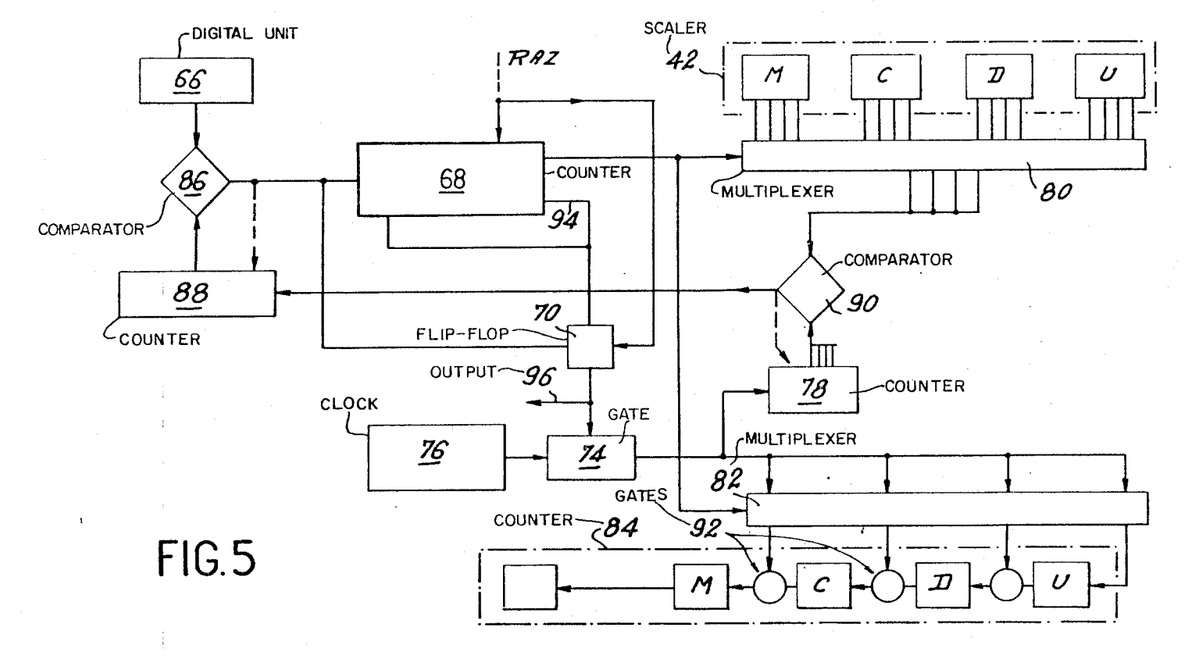
FIG. 5 is a schematic diagram of the unit for adapting to resonance operation any one of the harmonics 1 to 9 to the ultrasonic frequency (resonance on 1 to 9 half-wavelengths)

The unit 65 which is shown in the diagram of FIG. 5 comprises an "address selector" counter 68 which controls two multiplexers, namely a multiplexer 80 which is placed at the outputs of the scaler 42 and a multiplexer 82 which is placed at the inputs of a summation counter 84 having five decades if the scaler 42 has four decades, in order to take into account the possibility that the product of multiplication by $h$ (which can attain 9) in unit 64 may exceed a number of four decimal digits. A digital comparator 86 is placed between the display unit 66 (which indicates $h = 3$ in the exaple chosen) and a harmonic counter 88.

At the instant $\tau_2$, that is to say as soon as counting in the scaler 42 has been completed, a reset signal derived, for example, from the comparator 50 via a scale-of-two divider clears the address selection counter 68 to zero as indicated by the dashed-line arrow in FIG. 5. This reset signal is also applied to the control input 72 of a flip-flop 70 for opening a gate 74 which is interposed between a clock 76 (having a frequency of 10 Mc/sec, for example) and a single-decade counter 78 which is intended to receive the multiplicand of each product to be obtained, and to the reset input (not shown) of the counter 84. As soon as said reset signal has been received, the address selector 68 switches the multiplexers 80 and 82 for selecting the "units" decade, the four bit leads being derived from the mark U of the scaler 42 and counter 84.

The gate 74 having been opened at the instant $\tau_2$ (FIG. 4) by the reset signal, the multiplicand counter 78 begins to be filled with pulses at 10 Mc/sec derived from the clock 76. As soon as the comparator 90 establishes the identity of the contents of the counter 78 with the contents of the units decade of the scaler 42, said comparator delivers a pulse to the harmonic counter 88 and resets the multiplicand counter 78 to zero. Since the multiplexer 82 has selected the units decade in the summation counter 84, said decade has received at the time of resetting of the multiplicand counter a digit which is equal to the contents of the units decade of the scaler 42. So far as concerns the harmonic counter 88, said counter indicates the digit 1 on completion of this cycle. The operation resumes immediately and on completion of the second cycle the integrating counter 84 indicates a number which is double the preceding number. Gates 92 which are placed between the stages and controlled by the multiplexer permit any possible overshoot. In the particular case which has been contemplated in which the scaler initially contains the number 1,436, this overflow into the decade of tens takes place as soon as the second cycle commences and the harmonic counter 88 displays the digit 2 on completion of this cycle.

The cycle is repeated as long as the content of the harmonic counter 88 is smaller than the number displayed in the unit 66. In the example which is given, the multiplication operation is repeated three times. At the end of the third cycle, the counter 84 displays 18 while the harmonic counter 88 changes to 3. The comparator 86 then delivers to the address selection counter 68 a pulse which initiates the display of 1 and results in change-over to the "tens" decades in the multiplexers 80 and 82. The foregoing process is repeated : assuming that the tens decade of the scaler 42 displays 3, the counter 84 will receive three times (since the harmonic 3 is displayed) three pulses (since the tens decade of the scaler 42 displays 3) in the tens decade of the counter 84 and a carry will take place in the hundreds decade. The counter 84 which was previously at 18 changes to $18 + (9 \times 10) = 108$.

The hundreds are then accumulated in the same manner, followed by the thousands. At the end of counting in the hundreds, the pulse which is addressed by the comparator 86 to the address selector 68 causes this latter to change to 3. At the end of counting in the thousands, the additional pulse delivered by said comparator 86 cannot cause the selector 68 to advance any further; this selector is so designed that a pulse delivered in this case at a second output 94 causes a reversal of state of the flip-flop 70 and causes the gate 74 to close, with the result that no further pulses are transmitted from the clock 76 to the counter 78. The signal which causes the gate 74 to close is also transmitted to an output 96 which initiates at the instant $\tau_3$ the release of the synchronization unit as a result of application of the pulse 62. The synchronization unit is accordingly inhibited from the instant $\tau_0$ to the instant $\tau_3$ (cross-hatched portion of the curve $f$ of FIG. 4) and the multiplication by the number of the harmonic takes up the variable time interval $\tau_3$-$\tau_2$ which is indicated by the cross-hatched zone of the curve $j$ of FIG. 4. It must incidentally be noted that, when the harmonic $h = 1$ is displayed, the result contained in the scaler 42 is simply transferred into the counter 84.

The device which is illustrated in FIG. 1 comprises in addition to the units hereinbefore described an "enabling" 98 unit, the presence of which is not essential when working solely in half-wave resonance but which is necessary when the device operates on a harmonic since it is possible in that case to have a number of resonances per scanning cycle. The enabling unit is intended to permit processing and recording of a result by a memory 103 only if this result is within a range comprised between a minimum value and a maximum value which have been pre-displayed respectively in digital registers 100 and 102 (Contraves devices, for example).

The enabling unit 98 comprises two comparators 104 and 106, the outputs of which are applied to two inputs of an AND-gate 108. The comparator 104 delivers a signal at its output if the contents of the counter 84 exceed the minimum value or in other words the number displayed in the register 100 whilst the comparator 106 delivers a signal when the number contained on completion of the measurement in the counter 84 is below the maximum value indicated by the register 102. Although two input signals are applied simultaneously to the gate 108, this latter activates a linear gate 110 which permits the transfer into the memory 104 of the information contained in the counter 84 prior to resetting of this latter to zero. If the counter 84 has five decades, the registers 100 and 102 also have five decades.

The memory 103 illustrated in FIG. 1 is provided with a digital-to-analog conversion device of conventional type which makes use of a summing amplifier 112 supplied by a network of resistors which restore the respective weights of the digits forming part of each of the five decades. Provision is also made for a visual-display device 114 which gives the thickness in numerical form by making use, for example, of gallium-arsenide optoelectronic display elements.

The device which is shown diagrammatically in FIG. 1 further comprises units which provide the maximum value and the minimum value of the thickness of a tube which has been tested at a large number of points, these units being designated by the reference numerals 116 and 118. When a signal delivered on the lead 120 to said units in response to the end of testing of a tube, said units transfer at their outputs 122 and 124 the maximum and minimum thicknesses recorded from the time of previous resetting to zero as caused by application of a signal to the line 126 when a fresh tube is introduced.

Figure 6:
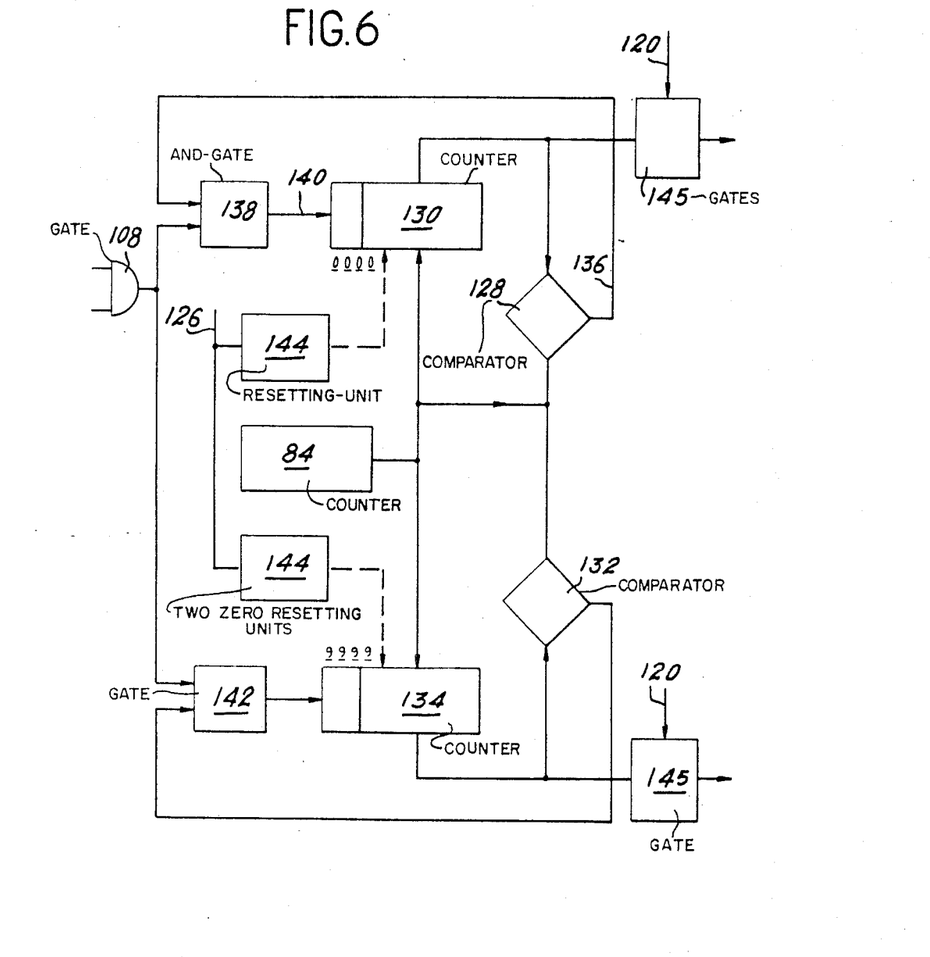
FIGS. 6 and 7 are block diagrams of a unit for determining the minimum thickness and maximum thickness and a unit for the determination of eccentricity which are intended for use in the device of FIG. 1.

The block diagram of the units 116 and 118 can be as shown diagrammatically in FIG. 6. In this figure, there is again shown the counter 84 in which appears at the end of a measurement the number corresponding to the thickness of the tube which will be designated hereinafter as Hn. A digital comparator 128 compares the determination of the maximum thickness. A second comparator 132 similarly compares the contents of the counter 84 with the contents of a counter 134 for the determination of the minimum thickness. These two comparators do not deliver any signal if the content Hn of the counter 84 is comprised between the contents of the counters 130 and 134. On the contrary, if the content of the counter 84 is higher than that of the counter 130, the comparator 128 delivers at its output 136 a signal which is applied to one of the inputs of an AND-gate 138. When the enabling signal derived from the above-mentioned AND-gate 108 is applied to the output input of said AND-gate 138, this latter delivers to the time-pulse input 140 of the counter 130 a pulse which initiates writing o the contents of the counter 84. The gate 142 has a similar operation and causes writing in the counter 134 of the contents of the counter 84 if these latter are below the minimum value which has previously been written.

At the beginning of testing of a tube, the counter 130 must contain only zeros whereas the counter 134 must be at its maximum capacity. This result is achieved by applying the beginning-of-test signal via the line 126 to two zero-resetting units 144 which introduce zeros within all the decades of the counter 130 and nines within the counter 134.

As a general rule, variations in thickness are such that only the least significant digits of the number which indicates the thickness are modified. In consequence, the counters 130 and 134 can comprise a smaller number of decades than the counter 84 (for example four instead of five) whilst the comparators 128 and 132 compare only the digits of the common decades.

When testing of a tube has been completed, the end-of-measurement signal which is applied on the line 120 activates the gates 145 for transferring the contents of the counters 130 and 134 to the corresponding systems of visual-display or registration.

The block diagram of FIG. 1 further comprises a stage 146 for the determination of the mean thickness. This stage will not be described since no constructional problem is involved and the design function of said stage is limited to division of the sum of numbers Hn which indicate the thicknesses (after the enabling operation) by the number of measurements taken. The validated results Hn are simply accumulated in an adder and the number of validated measurements is registered in a counter. The appearance of a signal on the line 120 indicates the end of a test and triggers a divider which establishes the ratio.

The device of FIG. 1 finally comprises a stage 148 for the determination of the mean eccentricity. As in the case of the stage mentioned above and also in the case of all the measurements of maximum and minimum thicknesses, the stage 148 is clearly not essential but can have the constructional design which is shown diagrammatically in FIG. 7.

Figure 7:
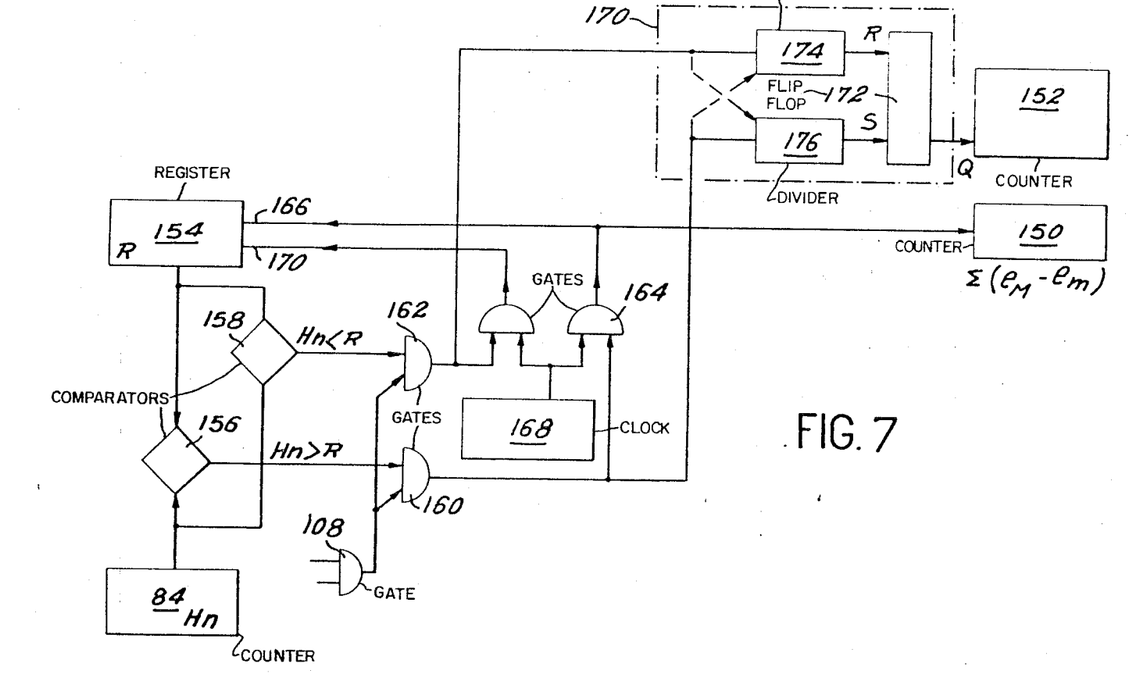

The unit of FIG. 7 determines the mean eccentricity on the basis of all the measurements which are carried out between the appearance of a signal at the input 126 and the appearance of a signal at the input 120. The operation of the unit is based on the assumption that, between two successive extremums (between two maximum values or between two minimum values), the tube has performed a complete revolution. In consequence, the measurement of the number of extremums will give the number of revolutions. In a complete revolution, the eccentricity $e_M-e_m$ is constituted by the half-difference between the maximum thickness $e_M$ and the minimum thickness $e_m$. The mean eccentricity will be obtained by dividing the sum of eccentricities $\epsilon(e_M-e_m)$ corresponding to one revolution by the number of revolutions performed.

The unit which is illustrated in FIG. 7 is intended to cause the appearance of the sum of eccentricities $\epsilon(e_M-e_m)$ in a counter 150 and the number of revolutions performed in a second counter 152. By way of example, it can be indicated that, in the case of tubes consisting of fuel cans for nuclear reactors and each tested at 100,000 points at a maximum and in respect of 3,000 revolutions, provision has been made for a counter 152 having five decades and a counter 150 having six decades for the summation of eccentricities. A dividing circuit (which is not illustrated but can be of conventional type) then divides the contents of the counter 150 by twice the contents of the counter 152 when said circuit is triggered by the signal which appears on the line 120.

The unit which is illustrated in FIG. 7 comprises a register 154 with five decades if the counter 84 has five decades, the contents R of which are compared with the contents Hn of the counter 84 by two comparators 156 and 158. According as the contents Hn of the counter 84 are higher or lower than the contents R of the register 154, either the comparator 156 or the comparator 158 accordingly delivers an output signal. In the case of equality, neither of the comparators supplies a signal. The enabling signal derived from the gate 108 is applied to two AND-gates 160 and 162. The other input of the gates 160 and 162 is connected in the first case to the output of the comparator 156 and in the second case to the output of the comparator 158. When the gate 160 is released, that is to say when an enabling signal and a signal derived from the comparator 156 are both applied simultaneously thereto, said gate opens a gate 164, thereby permitting application to the counting input 166 of the register 154 of signals which are derived from a clock 168 having a frequency of 10 Mc/sec, for example. The gate reverts to the non-conducting state as soon as the equality R = Hn is attained. If the contents of the register 154 are higher than those of the counter 84, a similar operation of the gate 162 permits the introduction of pulses derived from the clock 168 at the count-down input 170 until the equaltiy R = Hn is restored. The number of pulses which are necessary in order to achieve the equality constitutes the difference between two successive measurements. By applying the clock pulses which are transmitted by the gate 164 — and only said pulses — not only to the register 154 but also to the counter 150, there are thus summated the successive absolute values of $E_M-E_m$, in which $E_M$ and $E_m$ indicate a maximum value and a minimum value in succession.

The number of revolutions performed is determined from a measurement of the number of releases of the gates 160 and 162. But it is necessary to ensure that any local irregularity which causes an additional maximum and minimum value of thickness is not recorded as a tube revolution (the error introduced in $\epsilon(e_M-e_m)$ being on the other hand negligible). The unit 170 is designed to remove this danger. Accordingly, an extremum is taken into consideration as revealing one half-revolution only if it receives three successive measurements of increasing value after a minimum or three successive measurements of decreasing value after a maximum. To this end, the unit 170 comprises a flip-flop of the set-reset type, the inputs R and S of which are each driven by a scale-of-three divider. The number of three measurements is obviously given only as a non-limitative example. The control input of the divider is constituted by the gate 162 in the case of the divider 174 and by the output of the AND-gate 160 in the case of the divider 176. The signal applied as input to each divider 174 or 176 also serves as a reset signal for the other divider as indicated by the broken-line connections in FIG. 7. Successive pulses which are applied by way of example to the input R have evidently no action on the flip-flop 172 if this latter is already in the state in which its output Q is activated.

The invention is clearly not limited to the particular embodiment which has been described by way of example with reference to the accompanying drawings and it must be understood that the invention extends to any alternative form which remains within the definition of equivalent means and to any other applications. In particular, it is readily apparent that the device is equally applicable to the measurement of thickness both of sheet-metal plates and of tube walls.

What we claim is:

1. A method for measuring the thickness of an object with the aid of the resonant frequency of the object determined by a frequency scan of frequency-modulated ultrasonic waves, comprising the steps of:

generating ultrasonic oscillations;

frequency modulating said ultrasonic oscillations in accordance with a sinusoidal law;

directing said ultrasonic oscillations at said object;

measuring the time-duration, $\tau$, of a predetermined number, $N_o$, of periods of said ultrasonic oscillations starting from the occurrence of the resonant frequency of said object; and measuring the time-duration, $\tau'$, of a predetermined number, $N_1$, of periods of said ultrasonic oscillations starting at least from the end of the $N_o$ periods whereby the resonant frequency of said object free of the predominant error term arising from the frequency scan is obtained from $\tau$ and $\tau'$.

2. The method as claimed in claim 1, wherein the frequency scan has a 2:1 dynamic range, said $N'$ equals $2N_o$, and the time-duration o at which said resonant frequency occurs is computed to be $4\tau - \tau'/2$.

3. The method as claimed in claim 2, wherein said $\tau$ and $\tau'$ time intervals are obtained by summating pulses delivered by a clock means, said $\tau_o$ time interval is determined by counting at a frequency of $3/2F_c$ where $F_c$ is a predetermined frequency during the time interval of $N_o$ periods, then by counting-down at a frequency $F_c/2$ during the time interval of the following $N' - N_o$ periods.

4. The method as claimed in claim 2, wherein $N_o$ and $F_c$ are selected so that the number of clock pulses after counting-up and counting-down expresses the thickness of said object directly in convenient measuring units.

5. A device for measuring the thickness of an object, comprising, in combination:
an ultrasonic transducer for generating ultrasonic oscillations;
modulating means for frequency modulating said transducer to produce ultrasonic oscillations modulated in accordance with a sinusoidal law to obtain a frequency scan;
detecting means for detecting the resonant frequency of said object in response to said ultrasonic oscillations; and
counting means responsive to said detecting means for measuring the time-duration, $\tau$, of a predetermined number, $N_o$, of periods of said ultrasonic oscillations starting from the occurrence of the resonant frequency of said object and for measuring the time-duration, $\tau'$, of a predetermined number, $N'$, of periods of said ultrasonic oscillations starting at least from the end of th $N_o$ periods whereby the resonant frequency of said object free of the predominant error term arising from the frequency scan is obtained from $\tau$ and $\tau'$.

6. The device as claimed in claim 5, wherein the frequency range of the ultrasonic oscillations ranges from $f_o$ to $2 f_o$ and said counting means comprising a first pulse generator adapted to generate pulse signals at a frequency of $F_1$ during the $N_o$ ultrasonic periods, a counter for counting the pulse signals at the frequency of $F_1$, and a second pulse generator for generating a pulse signal at the frequency of $F_2 = F_1/3$ during the $N'$ ultrasonic periods, said counter being responsive to the pulse signal at the frequency of $F_2$ and counting-down in response thereto in order to obtain a direct read-out for the value of the time-duration $\tau_o$ at which said resonant frequency occurs.

7. The device as claimed in claim 5, wherein said counting means comprises a pulse generator and a counter connected thereto for measuring the $\tau$ of the $N_o$ periods, further comprising synchronizing means for synchronizing the beginning of the counting of the $N_o$ periods with the beginning of the counting of pulse signals from said pulse generator at the ultrasonic half-period immediately following recurrence of a resonance of said object.

8. The device as claimed in claim 5, further comprising storage means for storing the contents of said counting means and transfer means for transferring the contents of said counting means under completion of a measurement when the contents of said counting means rise within a predetermined range of values.

9. The device as claimed in claim 8, further comprising display means for displaying the number of frequency harmonics and multiplying means for multiplying the contents of said counting means being transferred by the number of the harmonic frequency.

10. The device as claimed in claim 9, wherein said multiplying means is based on the principle of decade-by-decade operation in series and the multiplication operation begins with the decade which has the smallest weight.

11. The device as claimed in claim 8, wherein said object is a tube to be tested at a large number of points, further comprising measuring means for determining the mean eccentricity present in each extremum transferred by said counter, rotating means for rotating said tube one half a revolution, summing means for summating the change in consecutive extremum for first and second positions of said tube which positions are separated by one half a revolution of said tube, and dividing means for dividing the summation obtained for the second position by the summation obtained for the first position.

12. The device as claimed in claim 11, further comprising eliminating means for eliminating the detection of extremums which are not followed by three measurements varying in the same direction.

* * * * *